(12) United States Patent
Kurihara et al.

(10) Patent No.: US 11,417,895 B2
(45) Date of Patent: Aug. 16, 2022

(54) FUEL CELL AND MANUFACTURING METHOD THEREOF

(71) Applicant: TOYOTA JIDOSHA KABUSHIKI KAISHA, Toyota (JP)

(72) Inventors: Takuya Kurihara, Miyoshi (JP); Kenji Sato, Kasugai (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/110,390

(22) Filed: Dec. 3, 2020

(65) Prior Publication Data
US 2021/0280879 A1 Sep. 9, 2021

(30) Foreign Application Priority Data
Mar. 9, 2020 (JP) .............................. JP2020-039465

(51) Int. Cl.
| | |
|---|---|
| *H01M 8/0276* | (2016.01) |
| *H01M 8/2483* | (2016.01) |
| *H01M 8/0286* | (2016.01) |
| *H01M 8/242* | (2016.01) |

(52) U.S. Cl.
CPC ....... *H01M 8/0276* (2013.01); *H01M 8/0286* (2013.01); *H01M 8/242* (2013.01); *H01M 8/2483* (2016.02)

(58) Field of Classification Search
CPC .................................................. H01M 8/0276
See application file for complete search history.

(56) References Cited

U.S. PATENT DOCUMENTS

| | | | |
|---|---|---|---|
| 2019/0131633 A1* | 5/2019 | Ishida | .................. H01M 8/0276 |
| 2019/0214655 A1* | 7/2019 | Nishida | ............. H01M 8/04089 |
| 2020/0153000 A1* | 5/2020 | Stöhr | .................. H01M 8/2483 |

FOREIGN PATENT DOCUMENTS

| | | |
|---|---|---|
| JP | 2017103070 A | 6/2017 |
| JP | 2017117521 A | 6/2017 |

* cited by examiner

*Primary Examiner* — Brian R Ohara
(74) *Attorney, Agent, or Firm* — Dickinson Wright, PLLC (57) ABSTRACT

A single cell includes a linear sealing portion bonded to a pair of gas separators, the sealing portion being provided between the gas separators. A fuel cell in which a plurality of single cells is laminated includes: a gasket provided between the single cells adjacent to each other; a first manifold communicating with an inside-cell gas passage; and a second manifold communicating with an inter-cell refrigerant passage. The gasket includes a first gasket placed to surround the outer periphery of the first manifold and configured to seal the first manifold, and a second gasket configured to seal the second manifold and an inter-cell refrigerant passage. When the fuel cell is viewed from the laminating direction, the first gasket, the sealing portion, and the second gasket are placed in this order from the first manifold toward the second manifold between the first manifold and the second manifold.

1 Claim, 5 Drawing Sheets

FUEL CELL AND MANUFACTURING METHOD THEREOF

INCORPORATION BY REFERENCE

The disclosure of Japanese Patent Application No. 2020-039465 filed on Mar. 9, 2020 including the specification, drawings and abstract is incorporated herein by reference in its entirety.

BACKGROUND

1. Technical Field

This disclosure relates to a fuel cell and a manufacturing method thereof

2. Description of Related Art

Generally, a fuel cell has a stack structure in which a plurality of single cells is laminated, and a refrigerant passage is provided between the single cells thus laminated. On this account, respective sealing structures for sealing reactant gas or refrigerant are provided in each single cell and between single cells adjacent to each other. As the sealing structure provided between the single cells adjacent to each other, a sealing structure including a gasket surrounding a gas manifold hole and a gasket surrounding a region including a refrigerant manifold hole has been known (e.g., see Japanese Unexamined Patent Application Publication No. 2017-117521 (JP 2017-117521)). In the sealing structure described above, the gasket surrounding the gas manifold hole and the gasket surrounding the refrigerant manifold hole are provided, so that these two gaskets are formed to extend side by side in a part where the gas manifold hole and the refrigerant manifold hole are placed close to each other.

SUMMARY

In a fuel cell configured such that a gasket is provided on an outer surface of a gas separator as such, when a sealing portion in a cell is to be formed at a position overlapping with the gasket in a laminating direction by heating from the outer surface side of the gas separator, heat input to form the sealing portion is restrained by the gasket, so that a sealing characteristic in the sealing portion might become insufficient. Particularly, insufficiency in heat input to form the sealing portion easily occurs in a part where two gaskets are formed side by side as described above.

This disclosure is achievable in the following aspects.

(1) One aspect of this disclosure provides a fuel cell in which a plurality of single cells is laminated. Each of the single cells includes a membrane electrode assembly, a pair of gas separators provided such that the membrane electrode assembly is sandwiched between the gas separators, and a linear sealing portion provided between the gas separators and bonded to the gas separators. The fuel cell includes a gasket, a first manifold, and a second manifold. The gasket is provided between the single cells adjacent to each other. The first manifold penetrates the fuel cell in the laminating direction of the single cells and communicates with an inside-cell gas passage through which reactant gas flows between the membrane electrode assembly and the gas separators. The second manifold is provided to be adjacent to the first manifold. The second manifold penetrates the fuel cell in the laminating direction of the single cells and communicates with an inter-cell refrigerant passage through which refrigerant flows between the single cells adjacent to each other. The gasket includes: a first gasket placed to surround an outer periphery of the first manifold and configured to seal the first manifold; and a second gasket configured to seal the second manifold and the inter-cell refrigerant passage. When the fuel cell is viewed from the laminating direction, the first gasket, the sealing portion, and the second gasket are placed in order of the first gasket, the sealing portion, and the second gasket from the first manifold toward the second manifold between the first manifold and the second manifold.

In the fuel cell of this aspect, it is possible to restrain such a situation that heat input to a part where the sealing portion should be formed is disturbed by the gaskets in a case where the sealing portion is formed by heating in the single cell. As a result, the sealing strength of the sealing portion can be easily increased, thereby making it possible to improve the sealing characteristic of the sealing portion in the fuel cell.

(2) In the fuel cell according to the above aspect, the each of the single cells may include an insulating sheet joined to an outer peripheral portion of the membrane electrode assembly between the gas separators. The first manifold and the second manifold may be formed to penetrate a part where the insulating sheet and the gas separators are provided in a laminated manner. The sealing portion may be a part of the insulating sheet. In the fuel cell of this aspect, the linear sealing portion bonded to the gas separators can be formed by use of the insulating sheet joined to the outer peripheral portion of the membrane electrode assembly.

This disclosure is achievable in various forms other than the above aspects. For example, the disclosure is achievable in forms such as a manufacturing method of a fuel cell, a single cell for a fuel cell, a manufacturing method of a single cell, and an arrangement method of a sealing portion in a fuel cell.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. Overall Configuration of Fuel Cell

Figure 1:
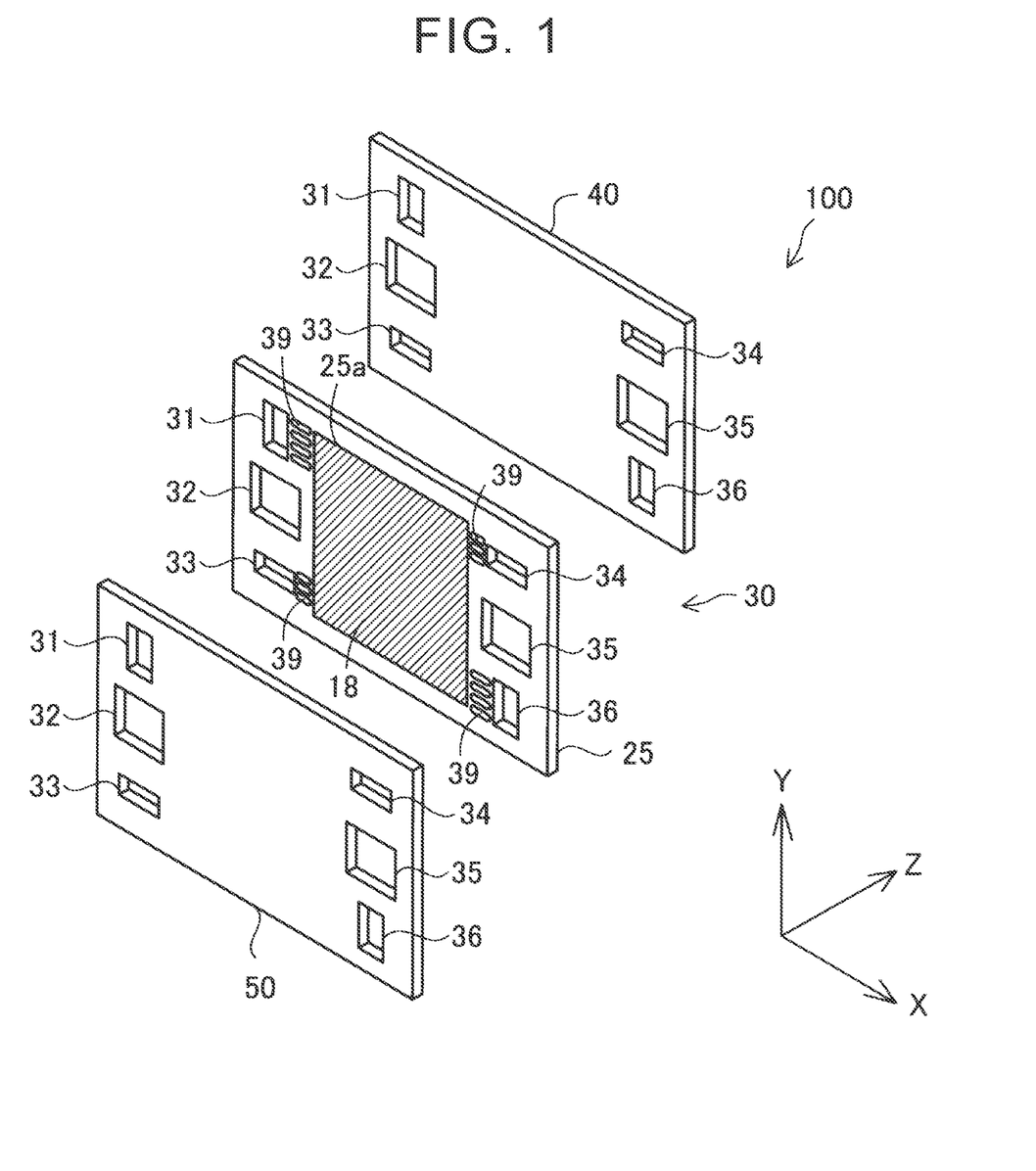
FIG. 1 is an exploded perspective view illustrating an outline of a configuration of a single cell.

FIG. 1 is an exploded perspective view illustrating the outline of a configuration of a single cell 100 provided in a fuel cell as a first embodiment of this disclosure. Note that FIG. 1 and drawings (described later) each schematically illustrate a state of each part in the fuel cell of the present embodiment. Accordingly, the size of each part illustrated herein does not indicate a specific size. The fuel cell of the present embodiment has a stack structure in which a plurality of single cells 100 is laminated. The fuel cell of the present embodiment is a solid polymer fuel cell but can be other types of fuel cells such as a solid oxide fuel cell. The single cell 100 includes a membrane electrode gas diffusion layer assembly 18 (hereinafter also referred to as an MEGA 18), a first gas separator 40, a second gas separator 50, and a resin sheet 25.

The MEGA 18 includes a membrane electrode assembly (hereinafter also referred to as an MEA) and a pair of gas diffusion layers sandwiching the MEA therebetween. The MEA includes an electrolyte membrane, an anode, and a cathode, and the anode and the cathode are catalyst electrode layers formed on respective surfaces of the electrolyte membrane. The resin sheet 25 holds the MEA so as to surround an outer peripheral portion of the MEA. A structure in which the MEA is joined to the resin sheet 25 is also referred to as a "sheet joining body 30." In the present embodiment, the resin sheet 25 is joined to the MEGA 18, and the sheet joining body 30 of the present embodiment includes a gas diffusion layer. The sheet joining body 30 is sandwiched between the first gas separator 40 and the second gas separator 50. A surface of the MEGA 18 on a side where the anode is formed on the electrolyte membrane faces the first gas separator 40, and an inside-cell fuel gas passage through which fuel gas flows is formed between the MEGA 18 and the first gas separator 40. A surface of the MEGA 18 on a side where the cathode is formed on the electrolyte membrane faces the second gas separator 50, and an inside-cell oxidation gas passage through which oxidation gas flows is formed between the MEGA 18 and the second gas separator 50.

In the MEGA 18, the electrolyte membrane is a proton conducting ion-exchange membrane made of a polyelectrolyte material, e.g., fluororesin, and exhibits a good proton conductivity in a wet condition. The anode and the cathode are porous bodies having air holes and are formed such that conductive particles carrying a catalyst such as platinum or platinum alloy, e.g., carbon particles, are coated with a polymer electrolyte having proton conductivity. The gas diffusion layer is constituted by a member having gas permeability and electronic conductivity. For example, the gas diffusion layer can be constituted by a metal member made of foam metal or metal mesh or a carbon member such as carbon cloth or carbon paper. The MEGA 18 is obtainable by pressing and joining the MEA to the gas diffusion layer, for example.

The resin sheet 25 is formed by use of resin such as thermoplastic resin and has an outer shape formed in a rectangular frame shape. The resin sheet 25 holds the MEA such that the MEA (the MEGA 18) is placed to close a central opening 25a. Further, as illustrated in FIG. 1, the resin sheet 25 is provided with a plurality of slit portions 39. The slit portions 39 have a structure via which the inside-cell fuel gas passage or the inside-cell oxidation gas passage communicates with a gas manifold (described later) formed inside the fuel cell including the single cell 100. The resin sheet 25 is also referred to as an "insulating sheet."

The resin sheet 25 can be a sheet configured such that modified polyolefin such as modified polypropylene to which adhesiveness is given by introduction of a functional group (e.g., ADMER (registered trademark) made by Mitsui Chemicals, Incorporated) is provided on surfaces of the resin sheet 25, the surfaces being bonded to at least the first gas separator 40 and the second gas separator 50, for example. If the resin sheet 25 can be bonded to the first gas separator 40 and the second gas separator 50 by heating, the resin sheet 25 may be made of materials other than the above.

In the present embodiment, that the resin sheet 25 is bonded to the first gas separator 40 and the second gas separator 50 indicates that hydrogen bonds or covalent bonds are formed as a result of progress of a chemical reaction between the surfaces of the resin sheet 25 and respective surfaces of the first gas separator 40 and the second gas separator 50 by hot-press. Parts, of the resin sheet 25, that are bonded to the first gas separator 40 and the second gas separator 50 seal fluid passages in the single cell 100. The arrangement of the parts, of the resin sheet 25, that are bonded to the first gas separator 40 and the second gas separator 50 will be describe later in detail.

The first gas separator 40 and the second gas separator 50 are rectangular plate-shaped members. The first gas separator 40 and the second gas separator 50 are each constituted by a gas impermeable conductive member, e.g., a carbon member made of dense carbon or the like formed by compressing carbon so as to be impermeable to gases, or a metal member made of stainless steel by press molding. In FIG. 1, irregular shapes formed on the surfaces of the first gas separator 40 and the second gas separator 50 to form a reactant-gas passage or a refrigerant passage are not illustrated.

In FIG. 1, a laminating direction (also a laminating direction of the single cells 100 and hereinafter just referred to as the laminating direction) of members including the MEA, the first gas separator 40, and the second gas separator 50 is indicated by a Z-direction. Further, in FIG. 1, directions perpendiculars to the laminating direction, that is, two directions parallel to the surfaces of the first gas separator 40 and the second gas separator 50 and perpendicular to each other are indicated by an X-direction and a Y-direction. In respective parts near the outer peripheries of the first gas separator 40, the second gas separator 50, and the resin sheet 25, manifold holes 31 to 36 to form manifolds are provided at positions where the manifold holes 31 to 36 respectively overlap each other in the laminating direction. Among four sides of each of the outer peripheries of the first gas separator 40, the second gas separator 50, and the resin sheet 25, the manifold holes 31 to 33 are formed along one of two sides extending in the Y-direction, and the manifold holes 34 to 36 are formed along the other one of the two sides extending in the Y-direction.

A manifold is a passage through which reactant gas or refrigerant circulates, the passage penetrating through the fuel cell in the laminating direction and communicating with an inside-cell gas passage formed in the single cell 100 or an inter-cell refrigerant passage formed between adjacent single cells 100. More specifically, oxidation gas manifolds communicating with the inside-cell oxidation gas passage are constituted by the manifold holes 31, 36, and fuel gas manifolds communicating with the inside-cell fuel gas passage are constituted by the manifold holes 33, 34. Further, refrigerant manifolds communicating with the inter-cell refrigerant passage are constituted by the manifold holes 32, 35. The oxidation gas manifold and the fuel gas manifold are also referred to as a "first manifold," and the refrigerant manifold is also referred to as a "second manifold." Further, the manifold holes 31, 33, 34, 36 constituting the gas manifolds are also referred to as a "first manifold hole," and the manifold holes 32, 35 constituting the refrigerant manifolds are also referred to as a "second manifold hole." In the resin sheet 25, the slit portions 39 described above are provided between each of the manifold holes 31, 33, 34, 36 and the central opening 25a.

In the second gas separator 50, a gasket is placed on a surface opposite to a surface making contact with the sheet joining body 30. The gasket seals a fluid passage between the single cells 100 adjacent to each other (hereinafter also just referred to as "between cells"). The gasket can be constituted by an elastic body. The elastic body to be used is, for example, rubber or thermoplastic elastomer. The arrangement of the gasket will be described later in detail.

B. Arrangement of Sealing Portion and Gasket

Figure 2:
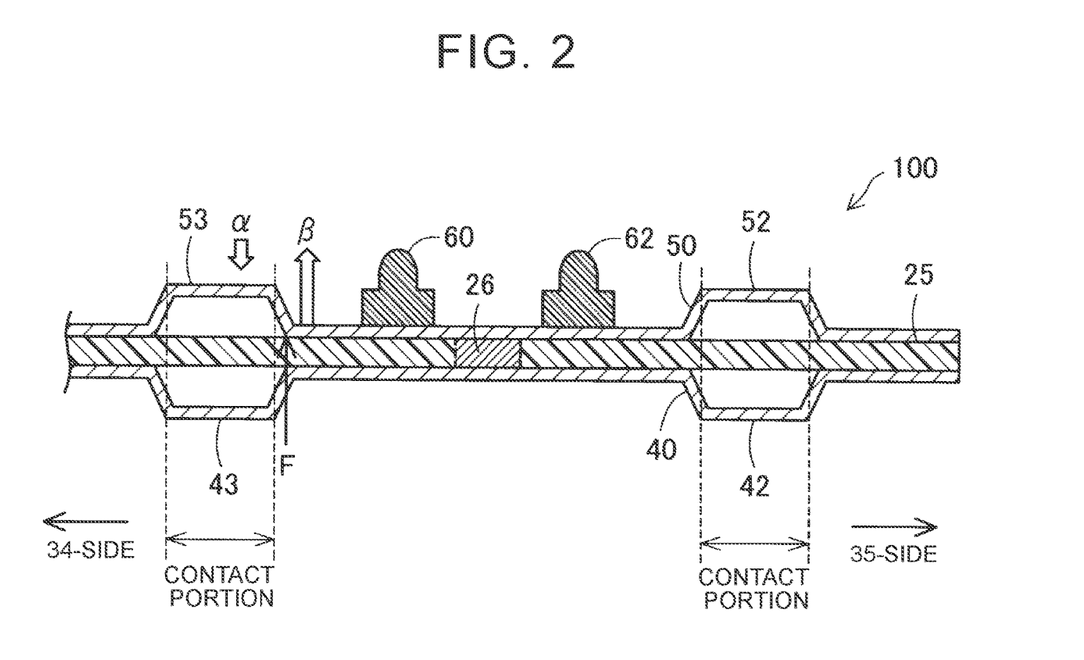
FIG. 2 is a sectional schematic view illustrating a schematic configuration of the single cell.
Figure 3:
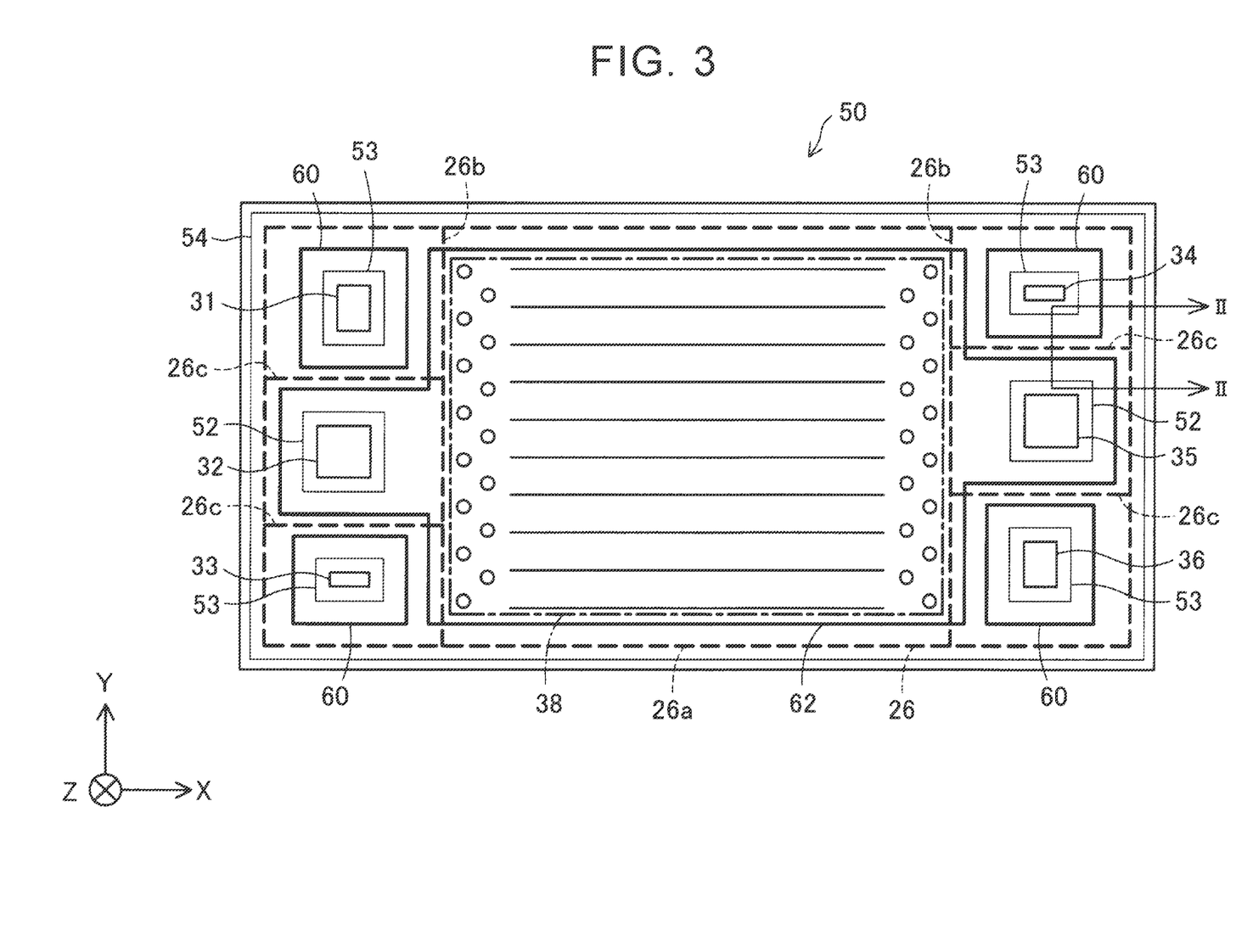
FIG. 3 is a plan view illustrating a second gas separator.

FIG. 2 is a sectional schematic view illustrating a schematic configuration of the single cell 100, and FIG. 3 is a plan view illustrating the second gas separator 50. The X-, Y-, Z-directions illustrated in FIG. 3 correspond to the X-, Y-, Z-directions illustrated in FIG. 1. FIG. 3 illustrates a state where the second gas separator 50 is viewed from the Z-direction, and in FIG. 3, a surface, of the single cell, that faces its adjacent single cell, that is, a surface on which the inter-cell refrigerant passage is formed is illustrated. In FIG. 3, a position corresponding to the section of FIG. 2 is indicated by a II-II section.

As illustrated in FIG. 2, the single cell 100 includes first gaskets 60 and a second gasket 62 as the aforementioned gasket provided on the second gas separator 50.

Respective first gaskets 60 and respective second gaskets 62 in the second gas separators 50 are provided such that the first gaskets 60 overlap each other in the laminating direction and the second gaskets 62 overlap each other in the laminating direction. When lips as distal ends, of the first gaskets 60 and the second gasket 62 in the single cell 100, that project in the laminating direction make contact with the first gas separator 40 of its adjacent single cell 100, pressing forces are applied in the laminating direction, so that reaction forces are caused in the first gaskets 60 and the second gasket 62. Hereby, the fluid passages between cells are sealed by the first gaskets 60 and the second gasket 62.

As illustrated in FIG. 2, the resin sheet 25 included in the single cell 100 is provided with a sealing portion 26 formed as a part bonding the resin sheet 25 to the first gas separator 40 and the second gas separator 50. That is, the sealing portion 26 is provided closer to the outer peripheral side of the single cell 100 than the MEA between the first gas separator 40 and the second gas separator 50 as a pair of gas separators and is bonded to the first gas separator 40 and the second gas separator 50. Respective sealing portions 26 of the single cells 100 are provided at positions where they overlap each other in the laminating direction.

In FIG. 3, respective positions where the first gaskets 60, the second gasket 62, and the sealing portion 26 are placed when the fuel cell is viewed from the laminating direction are illustrated in an overlapping manner with the second gas separator 50. The first gaskets 60 and the second gasket 62 are provided on a surface, of the second gas separator 50, that is observable in FIG. 3. In FIG. 3, the positions where the first gaskets 60 and the second gasket 62 are provided are indicated by bold continuous lines. The sealing portion 26 is provided on a back side, of the second gas separator 50, that is not observable in FIG. 3. In FIG. 3, the position where the sealing portion 26 is provided is indicated by a bold broken line. The first gaskets 60, the second gasket 62, and the sealing portion 26 are linearly formed along the surface of the second gas separator 50.

As illustrated in FIG. 3, the first gaskets 60 are placed along the outer peripheries of the manifold holes 31, 33, 34, 36 as the first manifold holes so as to surround the first manifold holes. Hereby, the first gaskets 60 seal the first manifolds as the gas manifolds between the single cells 100 adjacent to each other.

As illustrated in FIG. 3, the second gasket 62 surrounds a whole region where the inter-cell refrigerant passage is formed on the second gas separator 50 and the whole manifold holes 32, 35 as the second manifold holes. Hereby, the second gasket 62 seals the inter-cell refrigerant passage and the second manifolds as the refrigerant manifolds. The first gaskets 60 and the second gasket 62 are formed so that the gas passages sealed by the first gaskets 60 are distanced from the refrigerant passages sealed by the second gasket 62.

As illustrated in FIG. 3, the sealing portion 26 includes sealing portions 26a, 26b, 26c. The sealing portion 26a is provided along the outer periphery of the second gas separator 50 so as to surround a whole region where the manifold holes 31 to 36 are formed and a whole region where electrodes included in the MEA are placed in the single cell 100 (hereinafter a region overlapping, in the laminating direction, with the region where the electrodes are placed is also referred to as a power generation region 38). FIG. 3 illustrates the power generation region 38 by surrounding it by an alternate long and short dash line. The sealing portions 26b are formed as line segments extending in the Y-direction between a region where the manifold holes 31 to 33 are formed and the power generation region 38 and between a region where the manifold holes 34 to 36 are formed and the power generation region 38. The sealing portions 26b are also formed such that respective end portions thereof make contact with parts, of the sealing portion 26a, that face each other in the Y-direction. The sealing portions 26c are formed as line segments extending in the X-direction between the manifold holes 31 and 32, between the manifold holes 32 and 33, between the manifold holes 34 and 35, and between the manifold holes 35 and 36. The sealing portions 26c are also formed such that respective first end portions thereof make contact with the sealing portion 26a, and respective second end portions thereof make contact with their corresponding sealing portions 26b. Hereby, the manifold holes 31 to 36 and the power generation region 38 are individually surrounded by the sealing portion 26. In the single cell 100, the manifolds constituted by the manifold holes 31 to 36, the inside-cell fuel gas passage, and the inside-cell oxidation gas passage are individually sealed by the sealing portion 26.

As illustrated in FIG. 1, in the resin sheet 25 of the present embodiment, the slit portions 39 are provided in respective regions between the manifold holes 31, 33, 34, 36 and the MEGA 18, the respective regions being provided in the vicinity of the manifold holes 31, 33, 34, 36. The slit portions 39 include slits as a plurality of elongated through-holes extending toward the vicinity of the outer periphery of the MEGA18 from the vicinities of the outer peripheries of the manifold holes 31, 33, 34, 36. When the resin sheet 25 is sandwiched between the first gas separator 40 and the second gas separator 50, the slits form communication passages via which respective gas manifolds constituted by the manifold holes 31, 33, 34, 36 communicate with their corresponding inside-cell gas passages in the single cell 100. That is, the manifold holes 33, 34 communicate with the inside-cell fuel gas passage via the slit portions 39, and the manifold holes 31, 36 communicate with the inside-cell oxidation gas passage via the slit portions 39.

The first gaskets 60, the second gasket 62, and the sealing portion 26 are provided as described above. Accordingly, the first gasket 60, the sealing portion (the sealing portion 26c), and the second gasket 62 are placed in this order from the first manifold toward the second manifold between the first manifold (a gas manifold) and the second manifold (a refrigerant manifold) adjacent to each other in the fuel cell of the present embodiment when the fuel cell is viewed from the laminating direction. Here, a state where two manifolds are "adjacent to each other" indicates that no other passages are present between the two manifolds. More specifically, when the fuel cell is viewed from the laminating direction, the state indicates that other manifolds, inside-cell gas passages, and inter-cell refrigerant passages are not present between the two manifolds.

As illustrated in FIG. 3, in the present embodiment, when the second gas separator 50 is viewed from the laminating direction, other sealing members are not provided between each of the manifold holes 31, 33, 34, 36 and the first gasket 60 provided near the each of the manifold holes 31, 33, 34, 36 and between each of the manifold holes 32, 35 and the second gasket 62 provided near the each of the manifold holes 32, 35. Note that, in the second gas separator 50, a linear projection portion 53 surrounding each of the manifold holes 31, 33, 34, 36 is formed between the each of the manifold holes 31, 33, 34, 36 and its corresponding first gasket 60. Further, a linear projection portion 52 surrounding each of the manifold holes 32, 35 is formed between the each of the manifold holes 32, 35 and its corresponding second gasket 62. The linear projection portions 52, 53 are formed in the second gas separator 50 so as to project toward the inter-cell refrigerant passage side.

As illustrated in FIG. 2, in the first gas separator 40, linear projection portions 42, 43 are formed at respective positions overlapping the linear projection portions 52, 53 in the laminating direction such that the linear projection portions 42, 43 project toward the inter-cell refrigerant passage side. When the single cells 100 are laminated, respective head parts of the linear projection portions 52, 53 formed in the second gas separator 50 provided in a first single cell 100 make contact with respective head parts of the linear projection portions 42, 43 formed in the first gas separator 40 provided in a second single cell 100 adjacent to the first single cell 100.

Further, as illustrated in FIG. 3, a linear projection portion 54 projecting toward the inter-cell refrigerant passage side is formed in the vicinity of the outer periphery of the second gas separator 50 such that the linear projection portion 54 is placed along the outer periphery of the second gas separator 50 so as to surround the sealing portion 26a at a position closer to the outer periphery of the second gas separator than the sealing portion 26a. Further, in the first gas separator 40, a linear projection portion having a shape similar to the linear projection portion 54 is also formed at a position overlapping the linear projection portion 54 in the laminating direction, and when the single cells 100 are laminated, respective head parts of these linear projection portions make contact with each other (not shown).

When the single cells 100 are laminated, respective head parts of the linear projection portions facing each other in the single cells 100 adjacent to each other make contact with each other as described above, and the first gaskets 60 and the second gasket 62 formed in the second gas separator 50 of one of the single cells 100 adjacent to each other make contact with the first gas separator 40 of the other one of the single cells 100 adjacent to each other, so that the first gaskets 60 and the second gasket 62 are crushed and cause reaction forces. By providing the linear projection portions, the strength of the laminated body constituting the fuel cell is secured, and the gas separators are restrained from inclining, thereby making it possible to achieve uniform reaction forces caused in the first gaskets 60 and the second gasket 62. In FIG. 3, the positions where the linear projection portions 52 to 54 are provided are indicated by thin continuous lines.

C: Manufacturing Method of Fuel Cell

Figure 4:
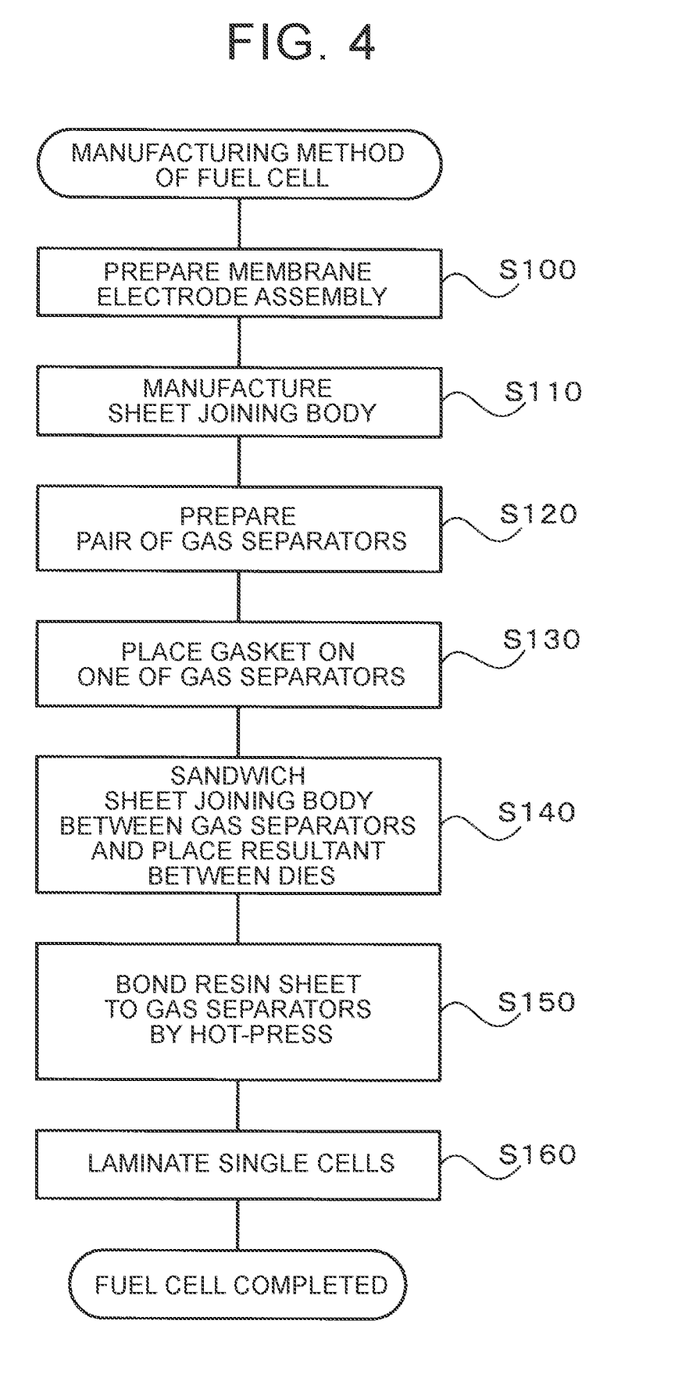
FIG. 4 is a process drawing illustrating a manufacturing method of a fuel cell.

FIG. 4 is a process drawing illustrating a manufacturing method of a fuel cell in the present embodiment. The following describes steps related to the formation of the sealing portion with reference to FIG. 4.

When the fuel cell is manufactured, an MEA 10 is prepared first (step S100). Then, the sheet joining body 30 is manufactured (step S110). The sheet joining body 30 is manufactured by joining the resin sheet 25 to an outer peripheral portion of the MEA 10. In the present embodiment, before the MEA 10 is joined to the resin sheet 25, the MEGA 18 is manufactured by pressing and joining the MEA 10 to the gas diffusion layers. Then, an electrolyte-membrane exposed portion in an outer peripheral portion of the MEGA is joined to an inner peripheral portion of the opening 25a of the resin sheet 25.

Further, the first gas separator 40 and the second gas separator 50 as a pair of gas separators are prepared (step S120). Then, the first gaskets 60 and the second gasket 62 are placed on a first surface of the second gas separator 50 as one of the gas separators (step S130). The first gaskets 60 and the second gasket 62 can be formed on the second gas separator 50 by injection molding, for example. Alternatively, the first gaskets 60 and the second gasket 62 may be bonded onto the second gas separator 50 by use of adhesive.

Subsequently, the sheet joining body 30 is sandwiched between the first gas separator 40 and the second gas separator 50, and the first gas separator 40, the second gas separator 50, and the sheet joining body 30 are placed between dies for hot-press (step S140). Then, the sealing portion 26 is formed by hot-press, and the resin sheet 25 is bonded to the first gas separator 40 and the second gas separator 50 (step S150), so that the single cell 100 is manufactured. More specifically, in step S140, the sheet joining body 30 is placed between the first gas separator 40 and the second gas separator 50 so that a surface of the second gas separator 50, the surface being opposite to the surface on which the first gaskets 60 and the second gasket 62 are provided, makes contact with the sheet joining body 30 so as to face the MEA.

Figure 5:
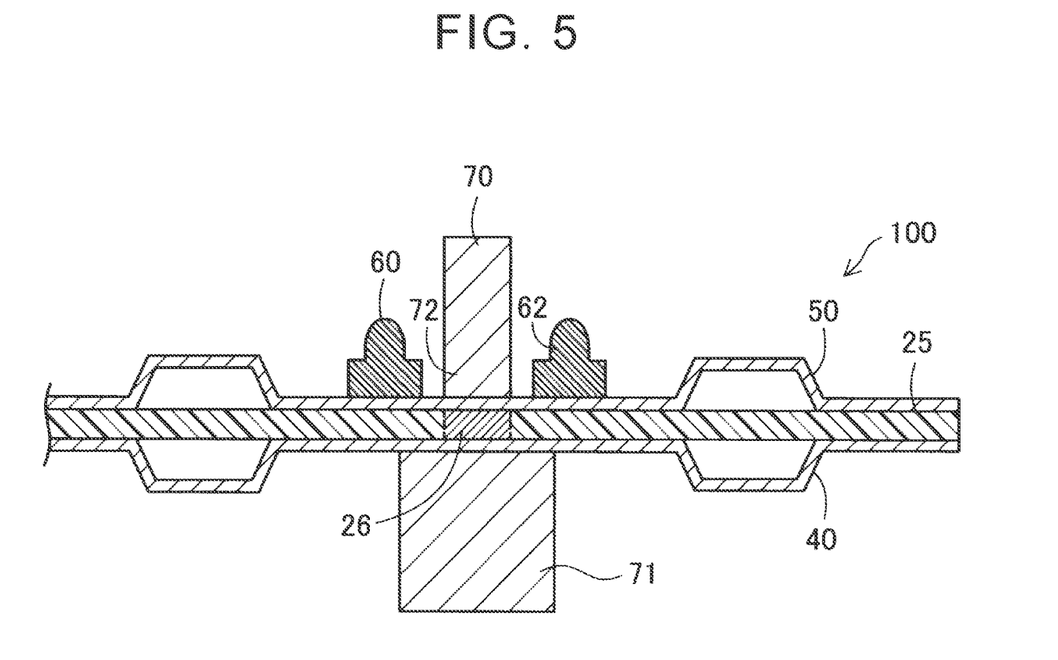
FIG. 5 is a sectional view schematically illustrating a state where hot-press is performed by use of dies.

FIG. 5 is a sectional view schematically illustrating a state where the hot-press is performed by use of the dies in step S150. A position of the section illustrated in FIG. 5 is the same position as the section illustrated in FIG. 2. In the present embodiment, a first die 70 and a second die 71 are used as the dies. The first die 70 to be used in step S150 includes a head portion 72. The head portion 72 is provided so as to make contact with the second gas separator 50 at a position where the sealing portion 26 illustrated in FIG. 3 is formed. That is, the head portion 72 is formed so as to make contact with the second gas separator 50 at a position sandwiched between the first gasket 60 and the second gasket 62 provided side by side.

In step S150, after each member is placed between the first die 70 and the second die 71, a load and heat are applied between the first die 70 and the second die 71 so as to perform hot-press on the resin sheet 25, the first gas separator 40, and the second gas separator 50. Hereby, the sealing portion 26 is formed in the resin sheet 25 at the position illustrated in FIG. 3.

After step S150, a plurality of single cells 100 on each of which the sealing portion 26 is formed is laminated to form a laminated body (step S160), and the whole laminated body thus obtained is fastened in the laminating direction. Hereby, the fuel cell is completed.

In the fuel cell of the present embodiment configured as described above, when the fuel cell is viewed from the laminating direction, the first gasket 60, the sealing portion 26, and the second gasket 62 are placed in this order from the first manifold (any of the gas manifolds constituted by the manifold holes 31, 33, 34, 36) toward the second manifold (a corresponding one of the refrigerant manifolds constituted by the manifold holes 32, 35) between the first manifold and the second manifold. On this account, it is possible to restrain such a situation that heat input to a part where the sealing portion 26 should be formed is disturbed by the gaskets in a case where the sealing portion 26 is formed by heating in the single cell 100. As a result, the sealing strength of the sealing portion 26 can be easily increased, thereby making it possible to improve the sealing characteristic of the sealing portion 26.

Further, in the present embodiment, the sealing structure in the single cell 100 is constituted by the linear sealing portion 26 formed by bonding the resin sheet 25 as a sealing member to the first gas separator 40 and the second gas separator 50. On this account, a simple and easy method called hot-press can be used to form the sealing portion 26. As a method for providing the sealing structure in the single cell 100, the following method is conceivable, for example. That is, a sealing member is placed between a pair of gas separators, and the whole sealing member is hardened by heating, so that whole contact faces of the sealing member are bonded to the separators. However, in such a method, it is necessary that the sealing member such as a resin sheet be made of thermosetting resin, and the whole resin sheet is hardened by heating. This requires a relatively long time for a step for bonding. In contrast, in a case where a sealing member including an adhesive material such as thermoplastic resin on its surface is placed between the separators, and a sealing portion having a linear shape corresponding to the shape of dies is formed by hot-press like the present embodiment, it is possible to form the sealing portion in a shorter time, thereby making it possible to achieve an efficient manufacturing step.

Further, in the present embodiment, by providing a gasket (the first gasket 60 or the second gasket 62) on a side closer to a manifold than the sealing portion 26, it is possible to restrain detachment of the sealing portion 26. The first gaskets 60 and the second gasket 62 constituted by elastic bodies perform sealing by causing reaction forces when pressing forces are applied in the laminating direction between the first gas separator 40 and the second gas separator 50. Accordingly, durability to the detachment at the time when a force to detach the gas separators from each other is applied by high-pressure fluid in the manifold is stronger than the sealing portion 26 that achieves its sealing characteristic by adhesive strength. On this account, with the above arrangement, it is possible to increase the durability of sealing in the fuel cell even when the force to detach the first gas separator 40 and the second gas separator 50 from each other is applied from the manifold side due to the pressure of the fluid in the manifold.

Note that, as the force to detach, from each other, the first gas separator 40 and the second gas separator 50 adjacent to each other, other forces are also conceivable other than the pressure of the fluid flowing through the manifold. The following describes this point. As described above, when the fuel cell in which the single cells 100 are laminated is viewed in the laminating direction, a contact portion is present between a manifold (e.g., the gas manifold constituted by the manifold hole 34) and a gasket (e.g., the first gasket 60). In the contact portion, the linear projection portion 43 formed in the first gas separator 40 makes contact with the linear projection portion 53 formed in the second gas separator 50 (see FIG. 2). In the contact portion between the linear projection portion 43 and the linear projection portion 53, a pressing force is applied in the laminating direction when the fuel cell is fastened. In FIG. 2, a state where a force a in the laminating direction is applied to the linear projection portion 53 of the second gas separator 50 constituting the contact portion is indicated by a blank arrow. When such a force is applied, a force β in a direction where the second gas separator 50 is detached from the resin sheet 25 with a part F as a fulcrum is caused. The part F is a part where the linear projection portion 53 rises from a region where the second gas separator 50 makes contact with the resin sheet 25. In FIG. 2, the part F is indicated by an arrow, and the force β caused in the second gas separator 50 is indicated by a blank arrow. This also applies to a contact portion where the linear projection portion 42 formed in the first gas separator 40 makes contact with the linear projection portion 52 formed in the second gas separator 50. In the present embodiment, even when the contact portion where the force β is caused is provided on the outer side of a manifold (e.g., the gas manifold constituted by the manifold hole 34 or the refrigerant manifold constituted by the manifold hole 35), a gasket (the first gasket 60 or the second gasket 62) and the sealing portion 26 are placed in this order on a further outer peripheral side from the contact portion. Accordingly, it is possible to restrain the gas separators from detaching from the resin sheet 25.

Further, in the present embodiment, on the first surface of the second gas separator 50, a region surrounded by the first gasket 60 (a region including any of the manifold holes 31, 33, 34, 36 constituting the gas manifolds) is distanced from a region surrounded by the second gasket 62 (a region including the manifold holes 32, 35 constituting the refrigerant manifolds and the power generation region 38). That is, a gas passage including a gas manifold and sealed by the first gasket 60 and a refrigerant passage including a refrigerant manifold and the inter-cell refrigerant passage and sealed by the second gasket 62 are distanced from each other. On this account, a space between the first gasket 60 and the second gasket 62 is provided as well as the first gasket 60 and the second gasket 62 between a passage through which reactant gas flows and a passage through which refrigerant flows. As a result, it is possible to restrain the gas flowing through the gas passage from permeating the refrigerant passage, thereby making it possible to restrain a component (e.g., hydrogen in the fuel gas) included in the reactant gas from being accumulated in the refrigerant flowing through the refrigerant passage that is a closed passage.

D. Other Embodiments (D1) In the above embodiment, the sealing portion 26 is formed by hot-press. However, other configurations may be employed. For example, the sealing portion 26 may be formed by laser irradiation or ultrasonic irradiation, provided that the linear sealing portion 26 can be formed by locally heating the resin sheet 25. Hereby, the same effects as the effects of the embodiment can be obtained.

(D2) In the above embodiment, the resin sheet 25 is used as a sealing member to form the sealing portion 26. However, other configurations may be employed. For example, an insulating sheet made of a material other than resin may be used. Further, the sealing portion 26 may be formed by use of a sealing member having a shape different from the resin sheet 25. For example, a part of the sealing portion 26 (the sealing portions 26a, 26b, 26c) may be formed by use of a sealing member different from a sealing member to form other parts of the sealing portion 26.

(D3) In the above embodiment, the whole circumference of each of the manifold holes 31, 33, 34, 36 constituting the gas manifolds is surrounded by the first gasket 60 and the sealing portion 26, and the whole circumference of each of the manifold holes 32, 35 constituting the refrigerant manifolds is surrounded by the sealing portion 26. However, other configurations may be employed. For example, the first gasket 60 may have discontinuous parts instead of surrounding the whole circumference of the each of the manifold holes 31, 33, 34, 36, provided that a desired sealing characteristic for the fuel cell is secured as a whole. Even in such a configuration, when the first gasket, the sealing portion, and the second gasket are placed in this order from the first manifold toward the second manifold between the first manifold as the gas manifold and the second manifold as the refrigerant manifold, the same effects as the effects of the above embodiment can be obtained.

The disclosure is not limited to the above embodiment and is achievable in various configurations within a range that does not deviate from the gist of the disclosure. For example, technical features of the embodiment, corresponding to the technical features of the aspects described in SUMMARY, can be replaced or combined appropriately, in order to solve some or all of the problems described above or in order to achieve some or all of the above effects. Further, the technical features can be deleted appropriately if the technical features have not been described as essential in the present specification.

What is claimed is:

1. A fuel cell in which a plurality of single cells is laminated, each of the single cells including a membrane electrode assembly, a pair of gas separators provided such that the membrane electrode assembly is sandwiched between the gas separators, and a linear sealing portion provided between the gas separators and bonded to the gas separators, the fuel cell comprising:

a gasket provided between the single cells adjacent to each other;

a first manifold penetrating the fuel cell in a laminating direction of the single cells and communicating with an inside-cell gas passage through which reactant gas flows between the membrane electrode assembly and the gas separators; and a second manifold provided to be adjacent to the first manifold, the second manifold penetrating the fuel cell in the laminating direction of the single cells and communicating with an inter-cell refrigerant passage through which refrigerant flows between the single cells adjacent to each other, wherein:

the gasket includes a first gasket placed to surround an outer periphery of the first manifold and configured to seal the first manifold, and a second gasket configured to seal the second manifold and the inter-cell refrigerant passage;

when the fuel cell is viewed from the laminating direction, the first gasket, the sealing portion, and the second gasket are placed in order of the first gasket, the sealing portion, and the second gasket from the first manifold toward the second manifold between the first manifold and the second manifold;

wherein the each of the single cells includes an insulating sheet joined to an outer peripheral portion of the membrane electrode assembly between the gas separators;

the first manifold and the second manifold are formed to penetrate a part where the insulating sheet and the gas separators are provided in a laminated manner; and the sealing portion is a part of the insulating sheet.

* * * * *